United States Patent [19]

Wills et al.

[11] Patent Number: 5,001,497

[45] Date of Patent: Mar. 19, 1991

[54] STREAM DEFLECTION JET BODY FOR LIQUID JET PRINTERS

[75] Inventors: Leslie J. Wills; David E. Turvey, both of New South Wales, Australia

[73] Assignee: Commonwealth Scientific and Industrial Research

[21] Appl. No.: 425,213

[22] PCT Filed: Mar. 2, 1988

[86] PCT No.: PCT/AU88/00056

§ 371 Date: Nov. 2, 1989

§ 102(e) Date: Nov. 2, 1989

[87] PCT Pub. No.: WO88/06525

PCT Pub. Date: Sep. 7, 1988

[30] Foreign Application Priority Data

Mar. 2, 1987 [AU] Australia ........................ PI 0603/87

[51] Int. Cl.[5] ............................................ G01D 15/18

[52] U.S. Cl. ...................................................... 346/75

[58] Field of Search .......................................... 346/75

[56] References Cited

U.S. PATENT DOCUMENTS 4,636,808 1/1987 Herron ................................ 346/75

*Primary Examiner*—Bruce A. Reynolds

*Assistant Examiner*—Gerald E. Preston

*Attorney, Agent, or Firm*—Sughrue, Mion, Zinn, Macpeak & Seas

[57] ABSTRACT

A printing head for generating slugs of liquid comprising: (a) a liquid stream generating section adapted to receive liquid under pressure and having an orifice for producing a coherent, continuous stream of the liquid; (b) an electrode supporting section on which is mounted an electrode, the electrode being positioned adjacent to the trajectory of the liquid stream and extending in the direction of flow of the liquid stream; and (c) a collector section, comprising an impingement region which is inclined towards the axis of the liquid stream when the liquid stream impinges thereon and a run-off region which is inclined away from the axis of the liquid stream at the point where the liquid stream impinges upon the impingement region.

2 Claims, 3 Drawing Sheets

STREAM DEFLECTION JET BODY FOR LIQUID JET PRINTERS

TECHNICAL FIELD OF THE INVENTION

This invention concerns apparatus for the generation of slugs of liquid of precise length, such as liquid jet printing apparatus. More particularly it concerns apparatus for producing slugs of liquid from an unbroken, coherent stream of liquid emerging from an orifice.

BACKGROUND TO THE INVENTION

In the liquid jet printing field (often termed the ink jet printing field in view of the common use of ink in the jet printers), a wide variety of apparatus is available for controlling the trajectory of liquid jets and the selection of liquid for printing.

Until now it has been generally accepted that accurate and reliable high resolution printing can only be obtained by printing with droplets of liquid and that the deflection and selection of these droplets should be effected after the droplet formation has taken place. However, there have been several previous attempts to control the trajectory, and hence the placement, of liquid streams by causing forces to act on a coherent, unbroken section of the stream issuing from an orifice. These prior art attempts have met with only limited success and most have suffered from one or more major disadvantages.

In most of the previous examples of stream deflection apparatus, the liquid stream is deflected by an electrostatic field and either the deflected or the undeflected part of the stream is interrupted before it impinges upon the printing substrate. The interruption has been effected either by a baffle or collector arrangement, or by the part of the stream to be collected being brought into contact with a convex deflector surface.

In the specification of U.S. Pat. No. 1,941,001 granted to Clarence W Hansell and assigned to Radio Corporation of America, an apparatus is described whereby an unbroken liquid stream is attracted by an electrode to which a high voltage has been applied, so that its deflected trajectory is interrupted by a baffle placed between the stream and the printing surface. In this case the stream is permitted to impinge upon the printing surface when in the undeflected trajectory and is interrupted (and thus is prevented from reaching the printing surface) when it is deflected. Since the transition of the stream from one trajectory to the other takes a finite time, the leading edge of the collector intercepts liquid in the transition region between the deflected and the undeflected region. This leads to a build up of liquid on the collector edge. This build-up reduces the selectivity of the collector, and leads to poor resolution of the printing and to fouling on the printed surface.

In another form of apparatus, described by N. E. Klein and W. H. Stewart in the specification of U.K. patent No 1,456,458, an air jet from a hollow tube is directed at a liquid stream to deflect an unbroken portion of the stream away from a direct trajectory to the substrate or surface being printed, into a trough or collector which intercepts the stream and prevents it reaching the printing surface. In this system the frequency response of the ON-OFF transitions of the stream are restricted by the switching speed of an electro-pneumatic valve which is used to direct the air current against the stream. This low speed of response directly translates to a lower resolution and quality of print than is possible with higher speed systems.

In yet another type of apparatus, which is described in the specification of U.S. Pat. No. 3,893,623 to Richard A Toupin (assigned to International Business Machines Corporation), a liquid stream is amplitude modulated to produce discrete droplets. A weir, placed at a critical location downstream and adjacent to the trajectory of the stream and droplets, intercepts selected droplets if the diameter of the periodic disturbance on the liquid stream is greater than the necessary value to clear the weir. Toupin's specification discloses the use of a curved surface to capture droplets at the droplet formation point in the liquid stream. However, the sloped collector surface (see FIG. 3A of that specification) is not designed for the high collection efficiency which may be obtained when using the coanda effect to capture liquid.

In an alternative method of jet printing, which uses electrodes placed in close proximity to a coherent unbroken stream and which is described in the specification of U.S. Pat. No. 4,384,296 to Peter A Torpey, the liquid stream is modulated to form discrete droplets and requires further deflection apparatus to properly define exact print positions for the droplets.

In a further disclosure relating to apparatus for steering fluid jets, namely the specification of British patent No. 2,041,831 to Graham Francis Stacy, a liquid jet is steered by causing it to come into contact with a convex curved surface. Contact between the liquid stream and the curved surface is effected by mechanical movement of either the convex surface or the jet body, or alternatively by frequency modulation of the jet. This technique has a number of disadvantages. It is very difficult to achieve the required close spacing of the deflecting curved surface relative to the liquid stream, and to simultaneously achieve the required relative displacement of the jet body and the convex surface. Also, no mechanism is described whereby the undeflected stream can be prevented from reaching the printing surface.

DISCLOSURE OF THE PRESENT INVENTION

It is an object of the present invention to provide apparatus for selecting slugs of liquid from a continuous liquid stream, for use in liquid jet printers, which substantially avoids the disadvantages of the prior art jet printing systems.

This objective is achieved by constructing a jet body for a jet printer in such a manner that it is a compact structure, having a single electrode and an efficient coanda effect collector, that can be used to establish slugs of liquid for accurate, controlled printing.

The jet body has a liquid stream generating section which receives liquid under pressure and which has an orifice that enables a coherent continuous stream of the liquid to be established. The stream of liquid passes over the remainder of the jet body, which can be regarded as an elongate structure, first over an electrode which has a surface that extends in the direction of flow of the continuous liquid stream, then over a collector section of the jet body. The collector section comprises a coanda effect collector which consists of a surface that includes a small acute angle with the axis of the liquid stream when the liquid stream is directed on to the collector, then slopes away from the direction of movement of the stream further from the liquid stream generating portion.

The electrode is used to deflect a portion of the unbroken liquid stream from its normal trajectory so that either the deflected or the undeflected portions of the stream contact the collector surface and, by virtue of the coanda effect, adhere to it. The collector surface shape ensures that the contacted portion of the stream is separated from the remainder of the stream. Thus the liquid stream is reduced to a series of liquid slugs of varying length, which can be used for printing purposes. It will be appreciated that slugs having a short length become droplets of liquid.

To effect the deflection of a portion of the unbroken stream of liquid, the electrode is mounted close to the stream of liquid and voltage signal is applied to the electrode as the portion of the liquid stream which is to be deflected flows past the electrode. The voltage signal applied to the electrode induces a charge of the opposite sign in the region of the fluid stream that is adjacent to the electrode and the resultant attraction causes the portion of the liquid stream to be deflected towards the charged electrode it is passing. The collector surface is placed so that it intercepts either the deflected or the undeflected liquid, to generate a required slug of liquid.

Thus, according to the present invention, there is provided a jet body for a liquid jet printer comprising (a) a liquid stream generating section adapted to receive liquid under pressure and having an orifice therein for producing a coherent, continuous stream of the liquid;

(b) an electrode supporting section on which mounted an electrode, the electrode being positioned adjacent to the trajectory of the liquid stream and extending in the direction of flow of the liquid stream; and (c) a collector section, comprising an impingement region which is inclined towards the axis of the liquid stream when the liquid stream impinges thereon, and a run-off region which is inclined away from the axis of the liquid stream at the point where the liquid stream impinges upon the impingement region.

As noted above, liquid from the stream may impinge upon the collector surface when the stream has been deflected from its normal trajectory, under the influence of a voltage signal applied to the electrode. However, the jet body may be designed so that the liquid stream normally impinges upon the collector surface and application of a voltage signal to the electrode is required to deflect the liquid stream to a trajectory which clears the impingement region of the collector surface.

A scoop collector or wall may be included in the jet body, downstream of the collector section. A vent is preferably included between the liquid stream generating section and the electrode supporting section. The jet body may be fabricated from a single block of an electrically insulating material or it may be constructed by assembling a number of separately fabricated components.

The electrode is preferably curved away from the axis of the undeflected liquid stream, and may be arcuate in the direction transverse to direction of flow of the liquid stream.

A plurality of such jet bodies may be fabricated from a single block, or a number of individual jet bodies may be connected together, to form an array of jet bodies as a printing head for a liquid jet printer.

The present invention also encompasses a jet printer which includes a printing head that comprises at least one jet body of the present invention.

Embodiments of the invention will now be described, with reference to the accompanying drawings.

DETAILED DESCRIPTION OF THE ILLUSTRATED EMBODIMENTS

In the specification of International patent application No PCT/AU87/00294, apparatus is described whereby accurate printing may be performed by using a travelling wave electrode arrangement and a coanda effect collector surface to select slugs of liquid for printing. The present invention is an improved form of that apparatus, with which even higher resolution and higher printing speeds are possible (and have been achieved with experimental apparatus manufactured by the present inventors).

In the embodiments illustrated in FIGS. 1, 2, 3 and 7 of the accompanying drawings, the application of an asymmetrical electrostatic force on a coherent, unbroken liquid stream causes that stream to deflect and contact a collector surface arranged substantially parallel to the undeflected stream or sloping away from the trajectory of the undeflected stream. This is achieved by placing an electrode in close proximity to the stream and applying a voltage signal to the electrode, thereby inducing surface charge on the stream of opposite sign to that on the electrode and causing a deflection of the stream by electrostatic attraction. The embodiment illustrated in FIG. 4 requires the application of a voltage signal to the electrode to deflect the liquid stream away from its normal trajectory, in which it impinges upon a collector surface.

Figure 1:
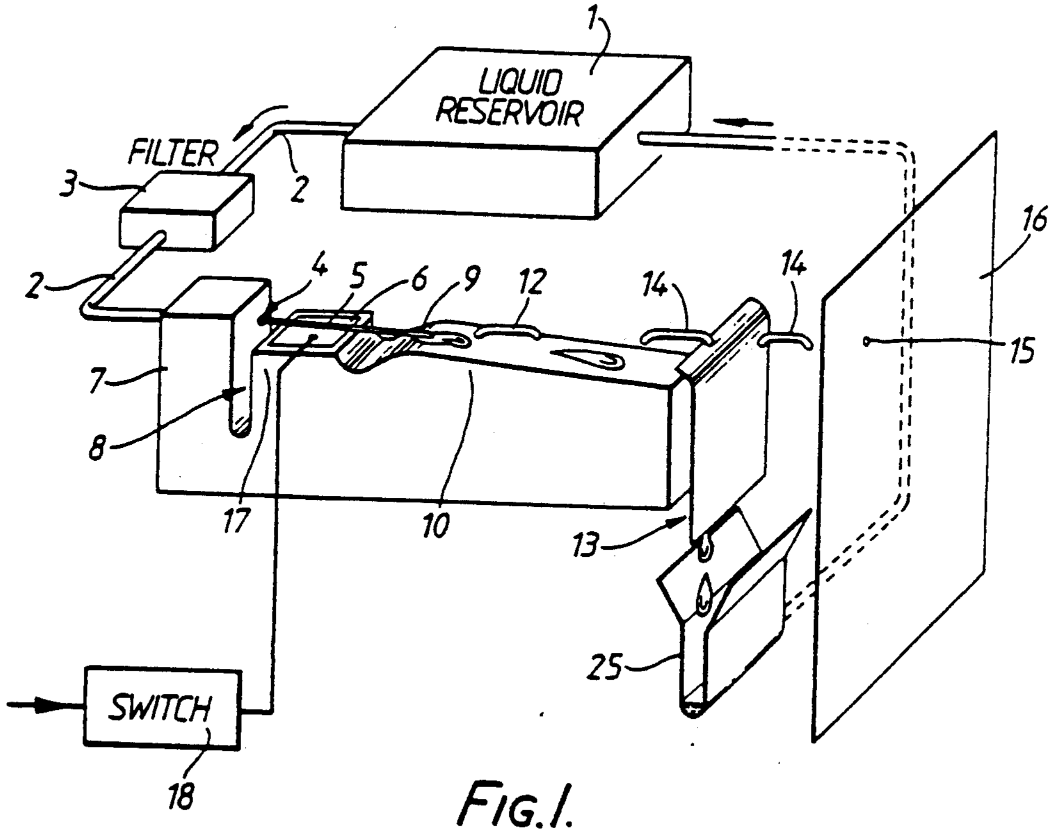
FIG. 1 is a diagram (partly schematic) of a liquid jet printer having a jet body constructed in accordance with this invention.

In the apparatus shown in FIG. 1, liquid under pressure (created by conventional means) is supplied to the stream generating section 7 of a jet body 17 from a liquid reservoir 1 via conduits 2. The liquid passes through a filter 3 before entering one side of a cavity in the stream generating section 7. The cavity has a narrow exit orifice 4, from which the liquid leaves the cavity as a high velocity, continuous and coherent liquid stream 5 of small cross-section. The liquid stream 5, if unaffected by any applied force, would normally strike a printing surface or substrate 16 at the point 15.

After traversing a vent 8, the liquid stream 5 from the orifice 4 passes closely above the electrode 6 which is mounted on the electrode supporting section 17 of the jet body. A high voltage signal (typically in the range of from 300 volts to 400 volts, but optionally higher) is applied to the electrode 6, usually as a voltage pulse, by the operation of an electrical signal switching means 18, which is controlled by a digital data source (not shown). Whenever a high voltage signal is applied to electrode 6, the stream 5 is attracted to the electrode due to redistribution of oppositely induced charge at the stream surface.

In the absence of a voltage signal on the electrode 6, the liquid stream 5 clears both the electrode 6 and the impingement region 9 of a coanda collector 10 of the jet body by the minimum practical spacing, which is determined by the precision engineering tolerances which can be achieved.

When a voltage signal is applied to the electrode 6, the deflected portion of the stream strikes the surface of the collector 10 at its impingement region 9. Upon contact with the impingement region 9, the liquid adheres to it by virtue of the coanda effect. The adhering liquid continues to flow in the same general direction, down the slope of the surface of collector 10 to be directed as it leaves the collector surface, by a scoop collector 13, into a gutter 25. Liquid collected in the gutter 25 is returned, via a conduit and under the action of a pump (not shown in the drawings) to the liquid reservoir 1.

A liquid slug 12 of the stream which has not been deflected by the electrode 6 escapes collection by the collector 10 and, therefore, is not intercepted by the scoop collector 13 but continues its projection to the printing substrate 16, where it produces marks (indicia) 15. The liquid slugs 14 shown in FIG. 1 are additional undeflected portions of the liquid stream which have escaped collection by the collector 10.

Figure 2:
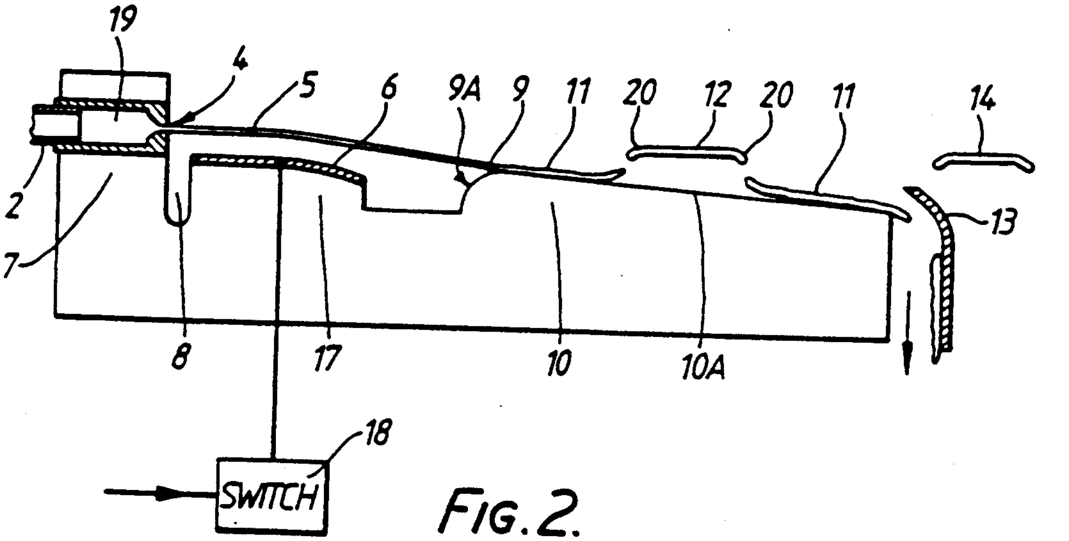
FIG. 2 is a sectional view (also partly schematic) of the jet body used in the printer of FIG. 1.

A more complete understanding of the operation of the jet body of FIG. 1 will be acquired with reference to FIG. 2.

In the jet body illustrated in FIG. 2 (which is that used in the printer of FIG. 1), liquid under pressure is supplied to the cavity 19 of the stream generating section 7 by means of an inlet pipe 2. The liquid stream 5 issues at high velocity from the orifice 4 and passes over the vent 8 and top surface of the electrode 6. The spacing between the electrode surface and the stream is maintained at the minimum practical value determined by the limitations of precision engineering. As shown in FIG. 2, the electrode is curved away from the direction of flow of the liquid stream 5, so that as the liquid stream is deflected when a voltage signal is applied to the electrode 6, the spacing between the liquid stream 5 and the electrode 6 remains substantially constant.

The vent 8, which in most cases is open to the atmosphere, between the orifice 4 and the edge of the electrode 6 is necessary in most practical embodiments to prevent the possibility of wall attachment of the liquid of the stream 5 to the adjacent electrode surface.

A high voltage signal, NB applied to the electrode 6 by the signal switching means 18 by a conducting connection, attracts the liquid stream towards the electrode 6 by electrostatic force. When in the undeflected projection, the stream clears the impingement region 9 of the collector 10 by the minimum practical value determined by precision engineering limitations and the stream aim stability.

The surface of collector 10 has an initial impact or impingement region 9 beginning towards the top of a convex surface 9A. The impingement region itself makes a small acute angle with the deflected liquid stream, and merges into a generally flat sloping section 10A down which the adhered liquid 11 flows. The convex shape preceding the impingement region 9 promotes streamlined flow on to the collector surface. Streamlined flow over the collector surface ensures that there is a clean detachment of the produced liquid slug 12 from the stream 5.

Where the ink or other liquid of the stream 5 is water-based, the surface of the collector 10 is preferably hydrophylic, although a surface which is simply able to be wetted by the liquid is sufficient in most cases. It has been found that the leading edge of the stream captured on the surface is less turbulent when the surface is either hydrophylic or prewet. One method of ensuring that the surface remains wet is by scouring with a fine abrasive paper. In a prototype collector, made from the commercial plastic DELRIN (trade mark), the scouring was performed with 400 grit abrasive paper.

For optimum performance of the present invention, there should be a clean collection of the liquid on the surface of the collector 10, leaving projected liquid slugs 12, 14 with no residual liquid between the slug and the surface. This performance requirement is similar to the requirement in synchronous droplet printers for the production of droplets which are free of satellite droplets. It can be met by having a wettable collector surface and a gradient appropriate to the stream velocity. The process of attaining residue free operation has been found to be essentially time dependent in the sense that the spatial separation between the stream and the surface occurs in no less than some minimum time determined principally by the diameter of the stream and the physical properties of the liquid.

The collection surface may have either a flat slope or a curved slope, but in both cases the limiting gradient is set by the above-noted requirement that no residue droplets, or tails, be formed between the projected stream and the surface.

The scoop collector 13 serves primarily to arrest collected liquid passing off the collector surface and to direct that liquid into the return circulation system. The level of the top of the scoop collector 13 must be such that it does not intercept liquid in the droop 20 at each end of a liquid slug, which is caused by energy imparted to the liquid stream during the collection process. Typically, this requirement means that there must be a clearance of two stream diameters between the undeflected liquid stream and the top of the scoop collector 13.

Figure 3:
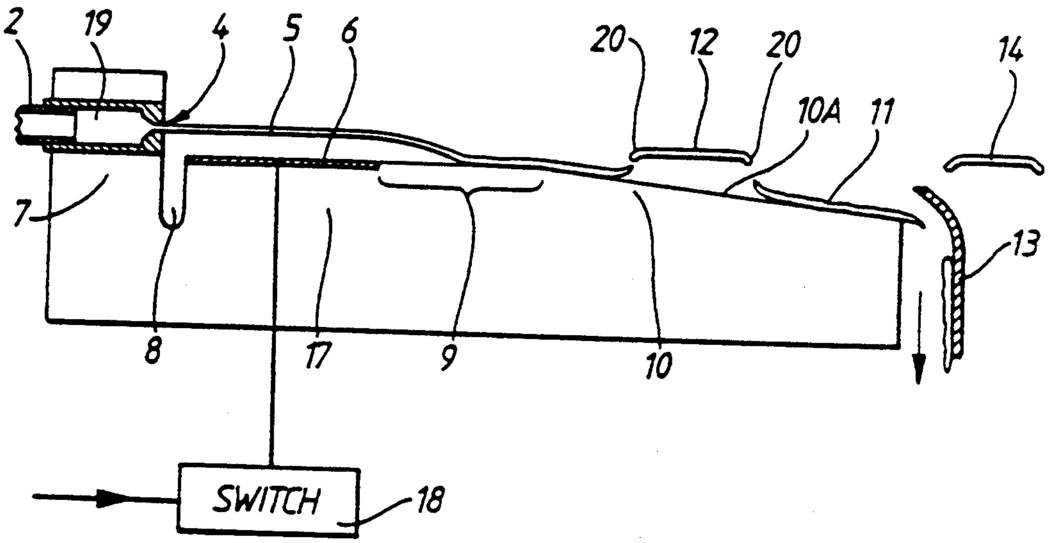
FIG. 3 is a sectional diagram of a modified form of the jet body of FIG. 2.

In the jet body illustrated in FIG. 3, a planar impingement region 9 for the deflected stream, is provided adjacent to, and contiguous with, the flat deflection electrode 6. The orifice 4 produces a liquid stream 5 which is deflected in response to a high voltage signal applied to the electrode 6. The signal applied to the electrode is of strength such that impingement of the stream on the collector surface occurs substantially in the centre of the impingement region 9. The liquid flattens on contact with the surface 9, and liquid slug separation is residue free as previously described.

The embodiment shown in FIG. 3 has manufacturing advantages in that the collector surface comprises two intersecting planes radiused at the intersection. The inclination of the sloping section is determined empirically as before and has the same surface texture. A small deflection of the stream will cause it to contact the impingement target area 19, which is simply a planar extension from the electrode surface. The small deflections of the stream ensure a smooth, non-turbulent attachment of the deflected liquid to the collector surface.

Figure 4:
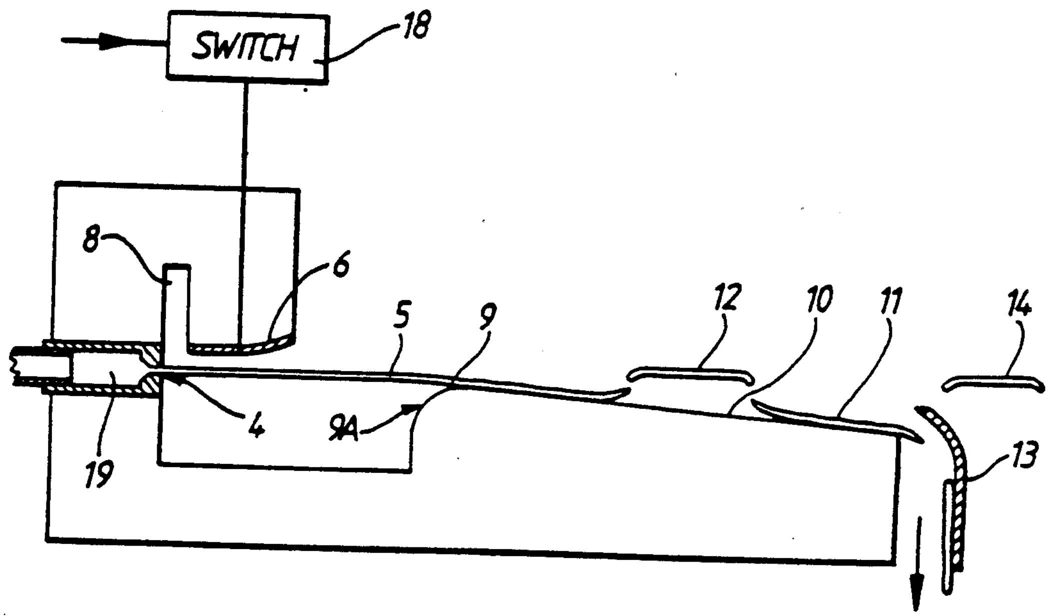
FIG. 4 is a sectional diagram of another form of jet body constructed in accordance with the present invention, in which the deflection electrode and the collector surface are on opposite sides of the liquid stream.

FIG. 4 shows a different arrangement of the components which constitute the jet body of the present invention. In this arrangement, the electrode 6 is placed on the opposite side of the liquid stream 5 to the collector 10. In this case, the clearance between the stream 5 and the electrode 6 is maintained as small as possible (as for the embodiments of FIGS. 1, 2 and 3) but the undeflected stream impinges upon the surface of the collector 10 just before the crest of the convex surface 9A. The undeflected projection of the stream is such that the impacted or intersected area is a minimum for reliable collection. In practice, this is determined mainly by the engineering tolerances on the collector placement, by the stream misaligrment and, to a lesser extent, by the surface characteristics of the coanda collector. In practice, it has been found that stream intersections of only two micrometres are necessary to collect a stream having a cross-sectional diameter of 250 microns. This close location of the collector surface relative to the axis of the undeflected liquid stream ensures a high spatial resolution of the system, because the stream moves only a very small distance to clear the collector. The higher the spatial resolution, the more accurately is the slug length determined and the higher the quality of the printing.

A significant advantage of the deflect-to-print arrangement shown in FIG. 4 is that the liquid stream is collected without any electrical signal being present on the electrode 6. This feature facilitates start-up procedures for the printer and allows the fluid system to operate in an "idle" condition with the electronic power off.

Figure 7:
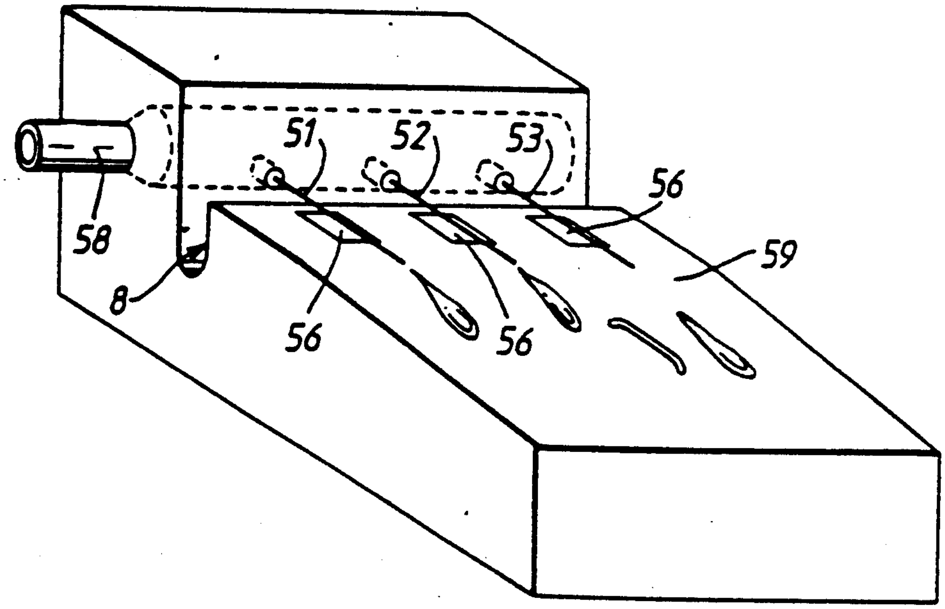
FIG. 7 is a perspective sketch of a printing head for a jet printer having a plurality of jet bodies constructed in accordance with the present invention.

FIG. 7 illustrates a printing head for a liquid jet printer in which three parallel liquid streams 51, 52 and 53 issue from respective orifices in the combined stream generation section 57 of three jet bodies. Liquid is supplied under pressure to the stream generation sections via a conduit 58. In practice, there will usually be more than three orifices in a linear array contained within a plane substantially parallel to the impingement region 59 of the combined collector sections of the jet bodies. Such printheads can be made in extended widths without interference between adjacent jets, which occurs with modulated droplet printers built in array form.

Printheads of the type illustrated in FIG. 7 require an independent electrical connection to each electrode 56, which is powered by a high voltage switch controlled from a digital data source (not shown in FIG. 7).

The present inventors have also developed the theoretical consideration of the application of the present invention. In general, if the jet body of the present invention (as illustrated in FIGS. 1, 2 and 3) is used to create a liquid stream of radius r located a distance s from a flat, planar electrode surface, the stream will experience an acceleration a towards the .electrode when a potential difference V is applied between the electrode and the stream, and a will be given by the relationship:

$$a = \frac{\epsilon_o V^2}{\rho \cdot r^3 \cdot \sqrt{(u^2 - 1)} \cdot (\cosh^{-1} u)^2}$$

where

-continued $$u = \frac{s + r}{r},$$

$\epsilon_o$ is the dielectric constant of free space, and

σ is the density of the liquid.

Using this relationship, it has been found that when a voltage signal of 350 volts is applied to the electrode, for a liquid of density 1.0, the accelerations possible for liquid streams which have cross-sectional diameters of 10, 50 and 250 microns, and s values of 10, 20, 50 and 100 microns, are shown in the following table:

| Stream Diameters | Accelerations | | |
|---|---|---|---|
| Spacing s | 10 microns | 50 microns | 250 microns |
| 10 microns | $1.01 \times 10^5$ g | $9.61 \times 10^3$ g | $8.8 \times 10^2$ g |
| 20 microns | $3.44 \times 10^4$ g | $3.33 \times 10^3$ g | $3.09 \times 10^2$ g |
| 50 microns | $8.47 \times 10^3$ g | $8.06 \times 10^2$ g | 76.9 g |
| 100 microns | — | — | 26.6 g |

These accelerations are those that are readily achieved without optimising the parameters used (such as increasing the voltage signal until limiting values of field strength are achieved, or using arcuate electrodes).

A constant acceleration of the stream towards the electrode during the application of the voltage signal indicates that if the gap or spacing between the electrode and the stream is to remain constant, then (as indicated above and as shown in FIGS. 2 and 4) the electrode 6 should be curved away from the stream to an extent determined by the stream velocity and the acceleration that is experienced by the stream. It has also been found to be advantageous to give the electrode a concave shape in the direction transverse to the flow direction of the liquid stream, since this shape is more effective in imparting transverse acceleration to the stream. A theoretical analysis of the performance of electrodes of differing transverse shape has indicated that for a constant stream to electrode spacing, a transversely concave electrode will impart roughly double the acceleration to the stream, compared to the acceleration achievable with a flat electrode, when the spacing is 50 microns, and it will impart about 3.5 times the flat electrode acceleration when the stream to electrode spacing is 10 micrometres.

The length of the electrode will be selected to achieve a desired stream deflection, taking into account such factors as the required precision in the length of liquid slugs, the distance downstream of the impingement region of the collector surface, and the precision with which the electrode can be spaced relative to the liquid stream.

Figure 5:
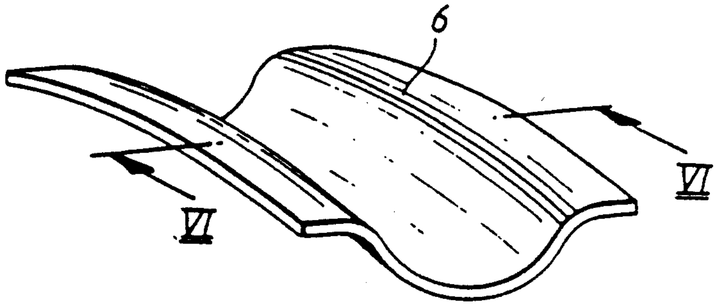
FIG. 5 is a perspective sketch of a preferred shape of the electrode of the jet bodies of FIGS. 2 and 4.
Figure 6:
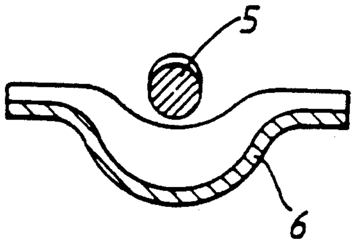
FIG. 6 is a sectional view at VI—VI of the electrode of FIG. 5.

Thus the electrodes used in the present invention preferably have the shape illustrated in FIGS. 5 and 6, which show an electrode which is curved in the direction of flow of the stream while having an arcuate transverse shape.

In prototype printing heads produced by the present inventors, the electrode length was in the range of from 0.5 to 3.5 mm, with the leading edge of the electrode positioned about 5 mm from the orifice of the stream generating section and the downstream edge of the electrode located about 10 mm from the impingement region of the collector.

Previous designers of liquid jet printers which include collectors working on the coanda effect principle have always asserted that deflection of the liquid stream into two separate paths has been adequate. However, the present inventors have found that with all such collectors, as described in the literature, in the region between the liquid adhered to the surface and the ends of the undeflected droplet, small residue droplets form which neither clear the collector scoop nor enter the scoop chamber, but rather impinge on and build up on the leading edge and uppermost surface of the scoop collector. In the present invention, an empirically determined topology of the collector is preferably adopted to prevent the formation of these residue or satellite droplets.

It is well known in the liquid jet printing field that particular droplet formation conditions prevent the formation of satellite or residue droplets. The analogy .in the present invention is that by controlling the rate at which the slug ends separate from the stream attached to the coanda surface, the formation of residue droplets can be avoided. The present inventors have ascertained that for a water based ink stream of diameter 250 microns and velocity of 12 metres per second, this is achieved by limiting the inclination of the sloping surface of the collector 10 to a value of 1 in 20.

The minimum length of the collector surface can be calculated by determining the minimum separation of the stream from its undeflected trajectory to ensure that it is arrested by the scoop collector 13, while the ends of the drops 20, on the leading and trailing edges of a liquid slug, clear the scoop collector 13. The typical droop extends about one stream diameter below the main region of the liquid slug. Thus, in a typical realisation of the present invention, the minimum slope length is 5 millimetres. However a further limitation is the dynamic retraction of the residue liquid between the stream and the liquid adhered to the collector surface by the coanda effect. This dynamic separation behaviour means that further time is required for full residue free separation to occur, which can readily be provided for by lengthening the sloping surface. Provision of some tolerance on the length of this surface for changes in liquid properties, in addition to the previous requirements, results in a typical safe final length for the collector surface of 15 mm and a clearance between the main portions of the liquid slugs and the top edge of the scoop collector of 0.5 mm.

Both single jet and multi-jet printing heads, incorporating the present invention, have been built and operated successfully by the present inventors. In the single jet prototypes, the fine adjustment of the positions of the electrode and of the collector surface was achieved using micro position translators (available from most optical equipment suppliers). For the multi-jet prototypes, the printing heads were made using normal manufacturing tolerances, then trimming of the electrode and collector surfaces was carried out by manually scraping these surfaces or by using a purpose-designed trimming tool. Precise control of the slug length was achieved using a feedback system which measured the response of printing head to a predetermined set of input parameters after each pass of the trimming operation.

One problem that did occur in the use of the first prototypes of the present invention when the gap between the electrode and the liquid stream became small (that is, less than about 100 microns when the stream diameter was 250 microns), was found to be due to the condensation of evaporated solvent from the stream on to the electrode. This condensation occurred whenever the electrode was colder than room temperature. Once initiated, the condensation built up because the evaporation of the condensate from the electrode surface cooled the electrode further, thus enhancing the condensation on the electrode.

This problem was overcome by the adoption of one of two techniques. In one technique, the electrode was heated, using (a) conduction of heat generated in a resistor mounted alongside (and in contact with) the electrode, or (b) radiation of heat generated in a miniature (300 milliwatts) incandescent lamp. The second technique comprised cooling the liquid before supplying it to the stream generation section of the jet body.

Those skilled in the jet printing art will appreciate that although specific exemplary embodiments of the present invention have been described above, modifications to such embodiments can be made without departing from the present inventive concept.

What is claimed is:

1. A jet body for generating slugs of liquid, characterised in that the jet body comprises:

(a) a liquid stream generating section (7) adapted to receive liquid under pressure and having an orifice (4) therein for producing a coherent, continuous stream (5) of the liquid;

(b) an electrode supporting section (17) on which is mounted an electrode (6), the electrode being positioned adjacent to the trajectory of the liquid stream (5) and extending in the direction of flow of the liquid stream; and (c) a collector section (10), comprising an impingement region (9) which is inclined towards the axis of the liquid stream on which the liquid stream impinges and a run-off region which is inclined away from the axis of the liquid stream at the point where the liquid stream impinges upon the impingement region.

2. A printing head for a liquid jet printer, characterised in that it comprises:

(a) a liquid stream generating section (57) adapted to receive liquid under pressure and having a linear array of a plurality of orifices therein, each said orifice being adapted to produce a coherent stream (51, 52, 53) of the liquid;

(b) an electrode supporting section on which is mounted a plurality of electrodes (56), each said electrode being positioned adjacent to the trajectory of a respective liquid stream from one of said orifices, and each electrode extending in the direction of flow of its associated liquid stream; and (c) a collector section comprising an impingement region (59), which is inclined towards the axis of the liquid streams when the liquid streams impinge thereon, and a run-off region which is inclined away from the axis of the liquid streams at the points where the liquid streams impinge upon the impingement region.

* * * * *